United States Patent [19]

Ueda

[11] Patent Number: 4,800,412
[45] Date of Patent: Jan. 24, 1989

[54] APPARATUS FOR DEVELOPING ELECTROSTATIC LATENT IMAGES

[75] Inventor: Masahide Ueda, Toyokawa, Japan

[73] Assignee: Minolta Camera Kabushiki Kaisha, Osaka, Japan

[21] Appl. No.: 841,611

[22] Filed: Mar. 20, 1986

[30] Foreign Application Priority Data

Mar. 22, 1985 [JP] Japan .................................. 60-59067
Apr. 4, 1985 [JP] Japan .................................. 60-72292

[51] Int. Cl.$^4$ ............................................ G03G 15/08
[52] U.S. Cl. .............................. 355/3 DD; 355/14 D; 118/658
[58] Field of Search ...................... 355/14 D, 3 DD; 118/657, 658

[56] References Cited

U.S. PATENT DOCUMENTS

| | | | |
|---|---|---|---|
| 3,939,801 | 2/1976 | Tanaka et al. | 118/658 |
| 3,988,816 | 11/1976 | Tada | 118/658 X |
| 4,030,447 | 6/1977 | Takahashi et al. | 118/658 |
| 4,365,586 | 12/1982 | Hosono et al. | 355/3 DD X |
| 4,425,373 | 1/1984 | Hosono et al. | 118/658 |
| 4,430,957 | 2/1984 | Cherbuy et al. | 118/657 |
| 4,468,111 | 8/1984 | Yamagata et al. | 118/658 X |
| 4,492,456 | 1/1985 | Haneda et al. | 355/14 D X |
| 4,511,239 | 4/1985 | Kanbe et al. | 355/3 DD |
| 4,525,056 | 6/1985 | Itaya et al. | 355/3 DD |
| 4,575,218 | 3/1986 | Sakamoto et al. | 355/3 DD |
| 4,577,587 | 3/1986 | Kamezaki | 355/3 DD |
| 4,607,933 | 8/1986 | Haneda et al. | 355/3 DD |
| 4,638,760 | 1/1987 | Nakamura et al. | 355/3 DD X |

FOREIGN PATENT DOCUMENTS

| | | | |
|---|---|---|---|
| 54-30837 | 3/1979 | Japan . | |
| 56-47552 | 6/1979 | Japan . | |
| 55-118065 | 9/1980 | Japan | 118/658 |
| 59-52267 | 3/1984 | Japan . | |
| 59-28431 | 8/1984 | Japan . | |

Primary Examiner—A. C. Prescott
Assistant Examiner—Jane Lau
Attorney, Agent, or Firm—Burns, Doane, Swecker & Mathis

[57] ABSTRACT

An electrostatic latent image developing apparatus which has a developing sleeve drivingly rotatable for transporting a developer, a magnetic roller fixedly positioned within the developing sleeve and having a plurality of N and S poles wherein one of said poles includes auxiliary poles of a weaker magnetic force, a bristle height restricting plate and apparatus for supplying the developer. Said auxiliary poles have the same polarity and are provided at one side of the sleeve opposite to the developing side thereof. Said bristle height restricting plate is provided between one of the auxiliary poles located downstream with respect to the direction of transport of the developer and the pole adjacent to the downstream auxiliary pole in the rotating direction of the developing sleeve.

By using this apparatus, developer after being used for developing is smoothly mixed and stirred with a newly supplied developer at the upstream side of said bristle height restricting plate.

8 Claims, 4 Drawing Sheets

APPARATUS FOR DEVELOPING ELECTROSTATIC LATENT IMAGES

BACKGROUND OF THE INVENTION

1. Field of the Invention

The present invention relates to an electrostatic latent image developing apparatus for use in the electrophotographic process or the like for developing electrostatic latent images formed on an image bearing surface.

2. Description of the Prior Art

Such electrostatic latent image developing apparatus heretofore provided are generally so adapted that a developer retained on the outer peripheral surface around a developing sleeve is transported circumferentially of the sleeve to a developing station where the sleeve is opposed to an image bearing surface to develop an electrostatic latent image formed on the image bearing surface. With copying machines made more compact in recent years for installation in smaller spaces, it is also highly desired to compact the developing apparatus itself.

After the developer has passed through the developing station and been used for development in the developing apparatus, the developer has a reduced toner concentration and therefore needs to be removed from the outer periphery of the developing sleeve for replacement by a fresh portion of developer supplied to the sleeve surface.

For this purpose, the used developer is usually scraped off the sleeve surface by a scraper disposed downstream from the developing station and held in pressing contact with the sleeve surface as disclosed in U.S. Pat. No. 4,392,735.

However, this requires a space for providing the scraper, entailing the problem of making the developing apparatus larger and costly to fabricate. When the developing sleeve is made rotatable for transporting the developer, improved transportability can be achieved effectively by forming minute indentations in the outer peripheral surface of the sleeve as by sandblasting. Nevertheless, if the scraper is provided in pressing contact with the surface of such a developing sleeve, there arises the problem that the toner lodges in the minute indentations owing to the pressing contact to cause a filming phenomenon.

On the other hand, the fresh developer portion supplied to the sleeve surface is further transported in an amount controlled by a bristle height restricting plate at a position upstream from the developing station. Consequently, another problem is encountered. The developer restrained by the restricting plate and retained at the upstream side of the plate is subjected to a stress by being pressed against the restricting plate by portions of developer which are subsequently transported forward in succession. This promotes deterioration of the developer resulting in a shortened life.

OBJECTS AND SUMMARY OF THE INVENTION

The main object of the present invention is to provide an electrostatic latent image developing apparatus which is free of the foregoing drawbacks and in which the portion of developer already used for development can be mixed with a fresh supply of developer by agitation and thereby readily replenished on the outer peripheral surface of a developing sleeve.

Another object of the present invention is to provide an electrostatic latent image developing apparatus in which the developer can be transported without entailing filming phenomena and is therefore transportable efficiently at all times.

Another object of the present invention is to provide an electrostatic latent image developing apparatus in which portions of developer can be mixed together smoothly by agitation to charge the toner satisfactorily.

Another object of the present invention is to provide an electrostatic latent image developing apparatus adapted to prevent the developer from deterioration and to assure a prolonged lifetime.

These objects of the present invention can be fulfilled by an electrostatic latent image developing apparatus which comprises a developing sleeve drivingly rotatable for transporting a developer to an electrostatic latent image bearing surface; magnetic means fixedly positioned in said developing sleeve and having a plurality of N and S poles arranged circumferentially within the sleeve, said N and S poles extending axially along the sleeve and including auxiliary poles having a weaker magnetic force, said auxiliary poles being provided adjacent to each other circumferentially within the sleeve at one side of said developing sleeve opposite to the developing side thereof, said auxiliary poles having the same polarity and being opposed to an intermediate portion of the path of transport of the developer; a bristle height restricting plate provided between one of said auxiliary poles located downstream with respect to the direction of transport of the developer and the pole adjacent to said downstream auxiliary pole in the direction of rotation of said developing sleeve; and means for supplying the developer to the path of transport of the developer at a position upstream from said auxiliary poles with respect to the developer transport direction.

DETAILED DESCRIPTION OF THE INVENTION

Figure 1:
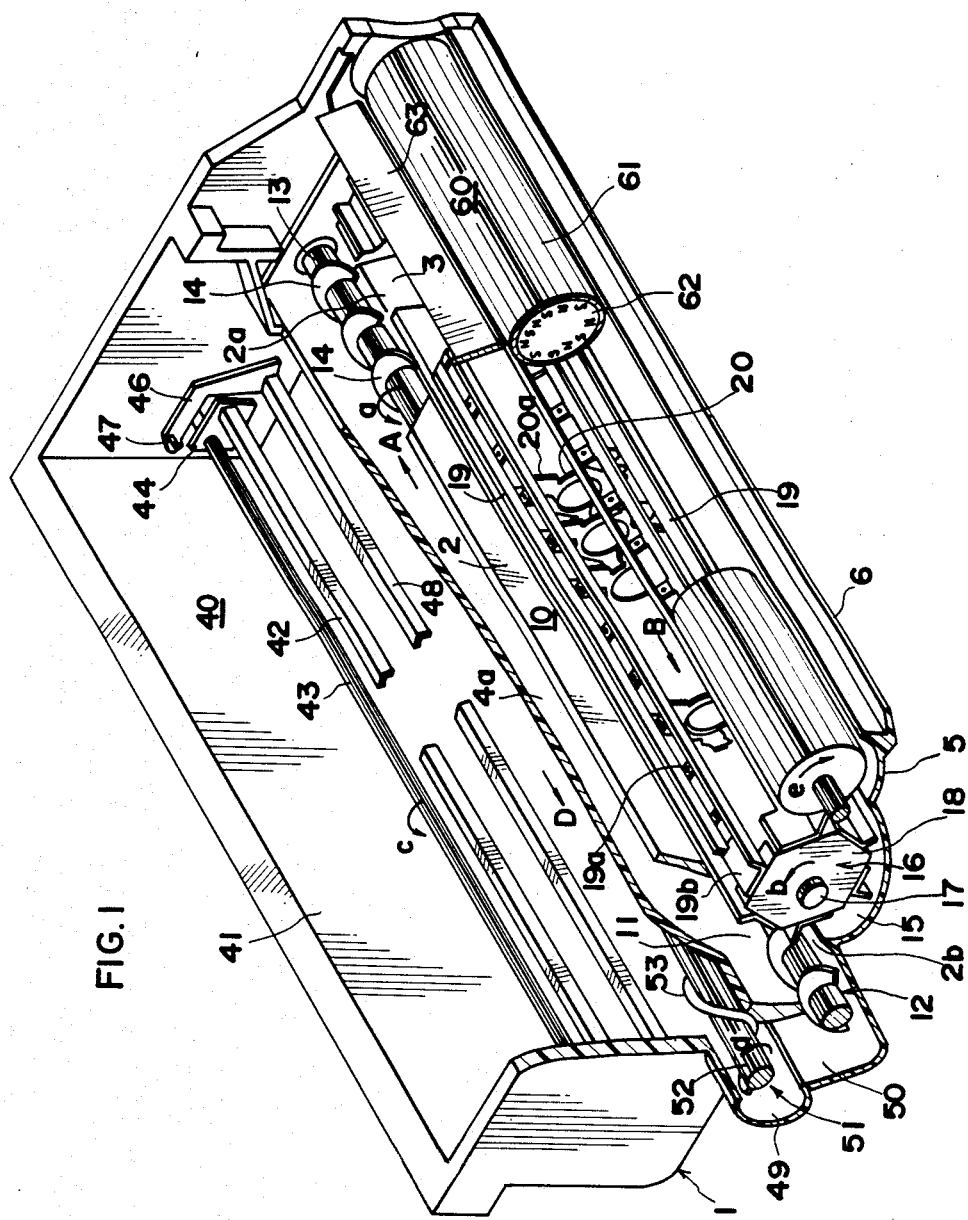
FIG. 1 is a perspective view showing the overall construction of an electrostatic latent image developing apparatus embodying the present invention.
Figure 2:
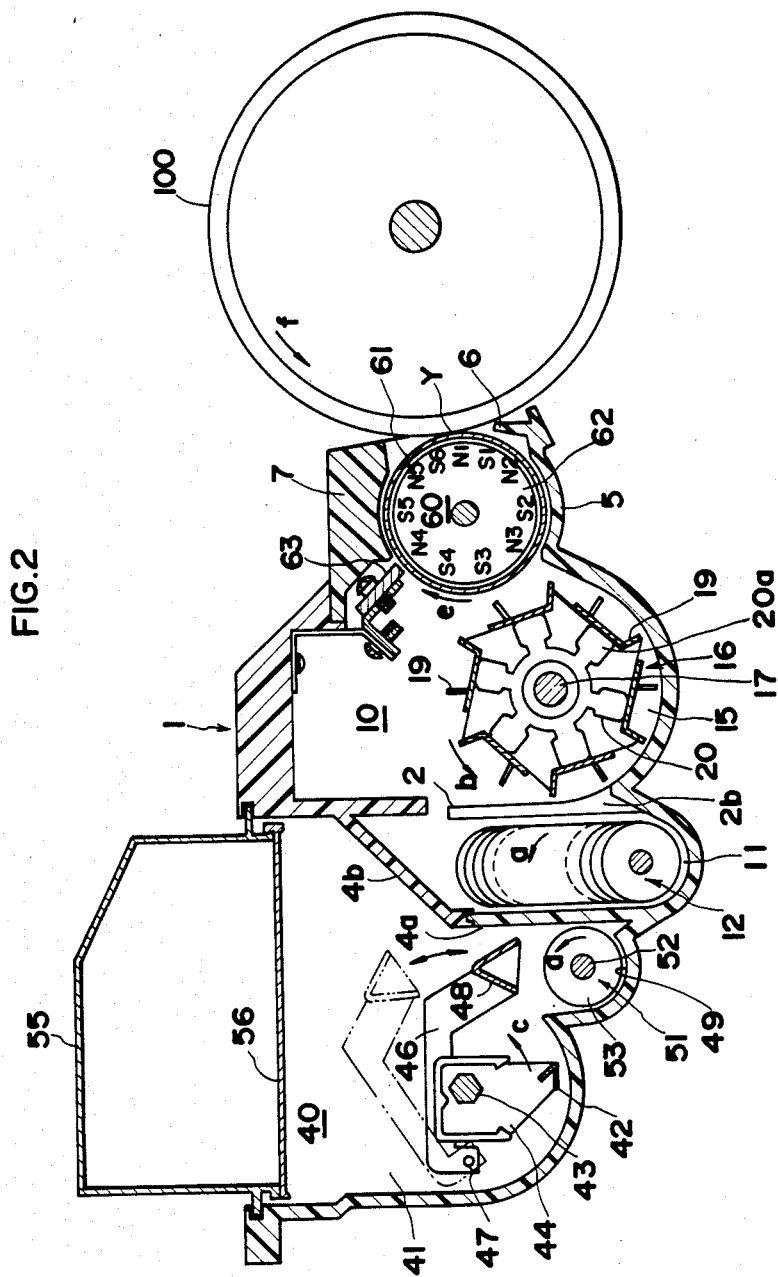
FIG. 2 is a sectional view showing the apparatus.

FIGS. 1 and 2 show an electrostatic latent image developing apparatus embodying the present invention which comprises a developer recycling transport assembly 10 including a screw roller 12 and a bucket roller 16, a toner containing assembly 40, and a developing assembly 60 having a developing sleeve 61 and a magnetic roller 62 housed in the sleeve 61. The component members are housed in a casing 1.

The developer recycling transport assembly 10 has a developer mixing-agitating transport path 11 and a developer supplying transport path 15 which are provided by downwardly bulging the bottom of the casing 1. The two transport paths 11 and 15 are separated by a partition plate 2 extending upward from the bottom of the casing 1 and communicate with each other through opposite end openings 2a and 2b of the partition plate 2. The transport path 15 is parallel with the developing sleeve 61. The transport path 11 is slightly so inclined that it is lower than the path 15 toward its left end in FIG. 1 and higher toward the other end thereof. At the opening 2a, the path 11 communicates with the path 15 over a slope 3. To render a developer smoothly flowable, the slope 3 has an angle equal to, or larger than, the angle of rest of the developer.

The screw roller 12 comprises a shaft 13 and blades 14 attached to the shaft 13 apparently in a helical arrangement. The screw roller 12 is drivingly rotatable in the direction of arrow a and provided in the transport path 11 as inclined at the same angle as the path 11. When rotated in the direction of arrow a, the screw roller 12 agitates the developer while transporting the developer in the direction of arrow A. Each blade 14 is approximately in the form of a half segment of a disk to assure a satisfactory mixing-agitating action.

The developer supplying transport path 15, which is in parallel with the developing sleeve 61, is at a lower level than the sleeve 61.

The bucket roller 16 comprises two hexagonal support plates 18, 18, buckets 19 each interconnecting the corresponding sides of the plates 18, and blades 20 arranged inwardly of the buckets 19 and attached thereto. The bucket roller 16 is disposed within the transport path 15 and is drivingly rotatable in the direction of arrow b by a shaft 17 extending through the roller 16. The bottom of each bucket 19 is left open except where small pieces 19a are arranged at an equal spacing to render the developer movable with increased freedom. At the left end of the roller 16 (FIG. 1), the bottom is closed as indicated at 19b to effectively transport the developer circumferentially of the roller 16. The blade 20 has a plurality of blade portions 20a provided around an annular portion and twisted at an angle of 15 degrees. The blade portions 20a each have a small projection (not shown) which is fitted in the small pieces 19a of the bucket 19, whereby the blade 20 is fixed to the buckets 19. When rotated in the direction of arrow b, the bucket roller 16 scoops up the developer with a side projecting portion of each bucket 19 and feeds the developer to the outer periphery of the developing sleeve 61, further transporting the developer in the direction of arrow B with the blades 20. In addition to the developer transporting function, the blades 20 also have the function of reinforcing the buckets 19 to prevent the buckets 19 from warping.

With the above arrangement, the developer is transported through the path 11 in the direction of arrow A and through the path 15 in the direction of arrow B by the rotation of the screw roller 12 in the direction of arrow a and by the rotation of the bucket roller 16 in the direction of arrow b. When transported in the direction A to the downstream end of the path 11, the developer is guided over the slope 3 through the opening 2a and transferred to the path 15. Further when transported in the direction B to the downstream end of the path 15, the developer is scooped up by the bottom portions 19b of the buckets 19 and transferred to the path 11 via the opening 2b. Thus, the developer is transported through the paths 11 and 15 in circulation. Since the downstream end of each of the transport paths 11 and 15 is at a higher transport level than the upstream end of the other path, the developer smoothly flows from each transport path 11 or 15 into the other transport path 15 or 11 through the opening 2a or 2b without remaining at the downstream end. Consequently, the developer will not be present in an increased amount locally, especially in the developer supplying transport path 15.

Furthermore, while being transported through the path 15 in the direction B, the developer is partly scooped up by the buckets 19 and fed to the outer periphery of the developing sleeve 61. Since the developer is transported through the path 15 uniformly, the developer can be fed to the sleeve 61 uniformly along the axis thereof.

The toner containing assembly 40 comprises a toner hopper 41 partitioned from the transport path 11 by walls 4a, 4b and disposed in the rear of the path 11, and a stirrer 42, empty sensor plates 46 and a replenishing roller 51 which are provided within the hopper 41. A toner bottle 55 containing replenishing toner is removably mounted on the top of the toner hopper 41. When the bottom plate 56 of the toner bottle 55 is slidingly withdrawn, the hopper 41 can be replenished with a supply of toner. The stirrer 42 is attached to the opposite ends of a support bar 43 by plate members 44 and is drivingly revolvable about the bar 43 in the direction of arrow c. The revolution of the stirrer 42 prevents bridging or blocking of the toner within the toner hopper 41. The replenishing roller 51 comprises a conveyor blade 53 provided helically around a shaft 52 and is disposed in a replenishing path 49 at the bottom of the hopper 41 and drivingly rotatable in the direction of arrow d. The left end (as seen in FIG. 1) of the path 49 is in communication with the transport path 11, with a toner replenishing slope 50 extending from the hopper bottom wall. To permit the toner to flow over the slope 50 smoothly, the slope has an angle equal to, or greater than, the angle of rest of the toner. By the rotation of the replenishing roller 51 in the direction of arrow d, the toner within the hopper 41 is transported along the path 49 to its right end in the direction of arrow D, guided over the slope 50 and supplied to the upstream end of the transport path 11.

The empty sensor plates 46 are pivotally movable upward and downward about pins 47 along the opposed inner end surfaces of the hopper 41. The free ends of the plates 46 are interconnected by a resistance plate 48. The empty sensor plate (not shown) on the left-hand side of FIG. 1 is fixedly provided with a magnet. A reed switch which is turned on by contact with the magnet is mounted on the hopper inner end surface opposed to the magnet. The sensor plates 46 are engageable with the stirrer 42 to move upward with the upward revolution of the stirrer 42 and move downward under gravity when released from the stirrer 42. More specifically, the empty sensor plates 46 move upward and downward every time the stirrer 42 makes a revolution. When the plates 46 lower, the resistance plate 48 is subjected to the resistance of the toner within the hopper 41, and the degree of resistance to lowering is in proportion to the amount of toner within the hopper 41. As the amount of toner decreases within the hopper 41, the empty sensor plates 46 move down to a lower position. When the hopper 41 becomes empty, the magnet on the left plate 46 actuates the reed switch to display absence of toner on the operation panel on the copying machine main body.

Figure 3:
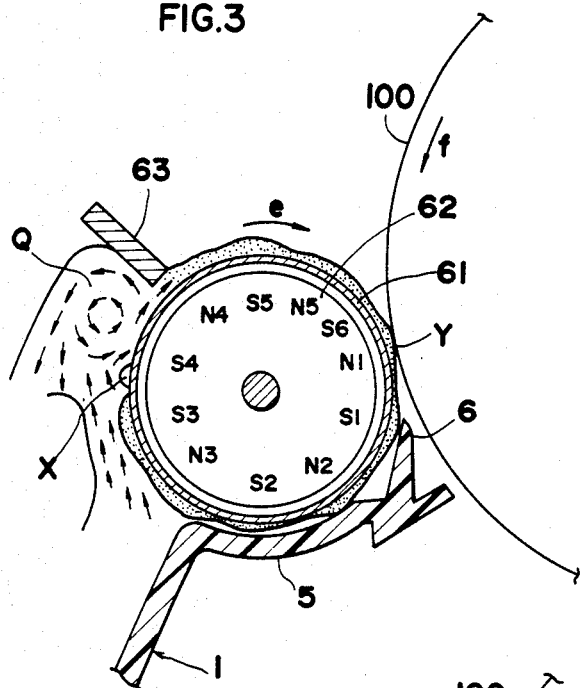
FIGS. 3 and 4 are fragmentary sectional views showing the apparatus.
Figure 4:
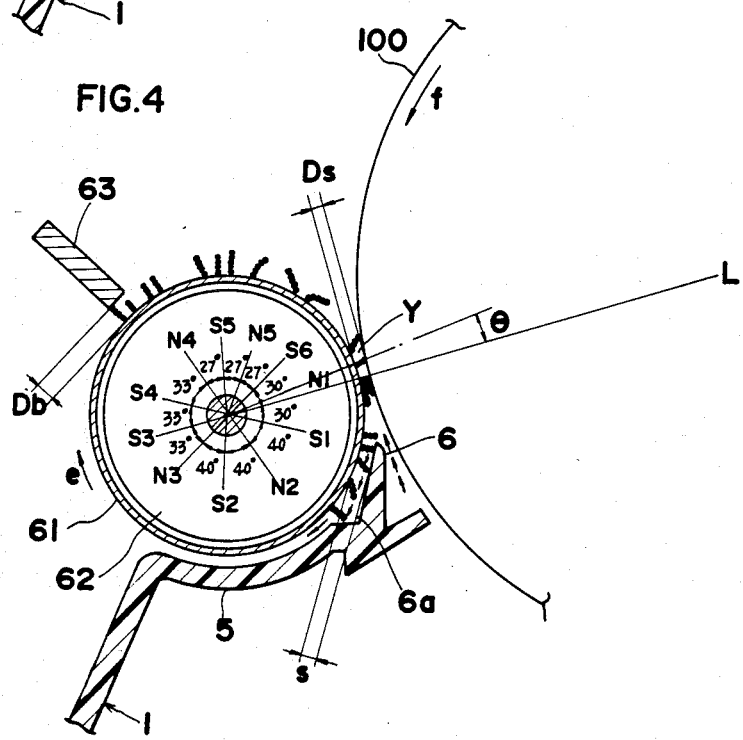

FIGS. 3 and 4 are fragmentary sectional views showing the developing apparatus described above. The developing sleeve 61 housing the magnetic roller 62 is provided at an opening of the casing 1. A bristle height restricting plate 63 has its forward end opposed to the outer peripheral surface of the developing sleeve 61. A toner confining plate 6 extends from the outer end of an arcuate portion 5 of the casing 1. The bucket roller 16 serving as means for supplying the developer and already described is disposed on the left side of the sleeve 61 at a lower level than the sleeve.

The developing sleeve 61 is in the form of a hollow cylinder made of a nonmagnetic electrically conductive material (such as aluminum). Minute indentations, 3 to 10 μm, are formed in the outer peripheral surface of the sleeve 61 by sandblasting. The developing sleeve is drivingly rotatable in the direction of arrow e and its periphery is opposed to the surface of a photosensitive drum 100 which is drivingly rotatable in the direction of arrow f. The developer is retained on the outer peripheral surface of the sleeve 61 magnetically by the magnetic roller 62 and transported in the direction of arrow e by the rotation of the sleeve 61.

Figure 5:
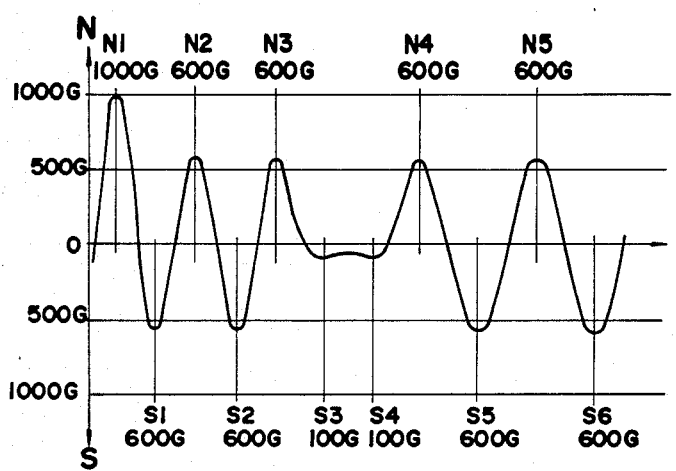
FIG. 5 is a graph showing the magnetic force distribution of a magnetic roller.

The magnetic roller 62 has magnetic poles N1 to N5 and S1 to S6 arranged along its outer periphery and spaced by the angles shown in FIG. 4, with the poles S3 and S4 of the same polarity positioned adjacent to each other circumferentially around the roller 62. The roller 62 is fixedly positioned within the developing sleeve 61 so that it not rotate. The magnetic forces of the poles of the magnetic roller 62 are distributed over the outer peripheral surface of the sleeve 61 as illustrated in FIG. 5. The poles S3, S4, which are termed auxiliary poles, have a smaller magnetic force than the other poles. The auxiliary poles S3, S4 are formed generally by forcibly magnetizing the two corresponding portions of a roller at the same time by an electromagnetic device opposed to these portions. Alternatively, a single S pole may be formed and then divided into two poles S3, S4 by forming a slit or providing a shield member. Further alternatively, two magnet bars may be arranged to provide the poles S3, S4. The auxiliary poles S3, S4 are positioned at one side of the developing sleeve 61' opposite to the other side thereof a developing station Y is provided. The auxiliary poles are also positioned so they are opposed to an intermediate portion of the path of upward transport of the developer around the sleeve 61. The developing pole N1 opposed to the developing station Y is positioned on a phantom radial line of the magnetic roller 62 which is upwardly angles away from a line L through the center of the roller 62 and the center of the photosensitive drum 100 by an angle θ. This angle θ is preferably 5 degrees in the present embodiment.

The bristle height restricting plate 63 has its forward end opposed to a portion of the roller 62 between the poles N4 and S4 and is positioned at an angle of 60 degrees with respect to a horizontal plane.

Immediately below the developing station Y, the toner confining plate 6 extends upward from arcuate lower opening edge of the casing 1 approximately along the periphery of the developing sleeve 61 and toward the surface of the drum 100. The free end of the confining plate 6 is opposed to the pole S1 immediately below the developing pole N1. In other words, the pole S1 is positioned on a line through the free end of the confining plate 6 and the center of the developing sleeve 61.

Provided immediately above the developing sleeve 61 is a toner confining plate as shown in FIG. 2 serving as a portion of the casing 1 for preventing toner particles from scattering upward.

With the arrangement described above, the developer is retained on the outer peripheral surface of the developing sleeve 61 by being magnetically restrained by the magnetic roller 62. By virtue of the rotation of the sleeve 61 in the direction e the developer is transported on the sleeve surface in the direction e to develop at the station Y an electrostatic latent image formed on the surface of the drum 100. The amount of developer to be fed to the developing station is restricted to a quantity corresponding to the gap Db between the restricting plate 63 and the sleeve 61 when the developer passes the plate 63.

As already described, a fresh portion of developer is supplied by the rotation of the bucket roller 16 to the surface of the developing sleeve 61 at the position opposed to the poles N3 and S3.

Stated in detail with reference to FIG. 3, the developer is separated from the surface of the sleeve 61 at the location where the auxiliary poles S3, S4 are present, owing to a repellent magnetic field X between these poles, an is mixed and agitated with a convectional portion of developer at the upstream side Q of the restricting plate 63 upon colliding therewith. Stated more specifically, when the portion of developer used for development (with a reduced toner concentration) is to be replenished with a fresh portion of developer at the position opposed to the poles N3, S3, the used developer portion is temporarily removed from the sleeve surface at the position where the repellent magnetic field X is present, and mixed by agitation with the fresh portion at the convection position Q which is not affected by the magnetic force of the auxiliary poles S3, S4. The resulting mixture is partly attracted to the auxiliary pole S4 and transported to the developing station Y in an amount regulated by the restricting plate 63. The convection portion Q acts, so to speak, as a damper for the transport of the developer, preventing the pulsating flow of developer supplied by the bucket roller 16 from producing irregularities in the amount of developer traveling past the restricting plate 63. Accordingly it is suitable that the restricting plate 63 be opposed to the developing sleeve 61 at a position a small distance upstream from the pole N4 and set to such an angle (30 to 90 degrees with a horizontal plane) that the developer scattered by the repellent magnetic field X can be guided outward away from the sleeve 61 by the upstream side of the restricting plate 63 and allowed to spontaneously fall at a location magnetically unaffected by the magnetic field X. With the present embodiment, the plate 63 is at an angle of 60 degrees with a horizontal plane. Preferably the auxiliary poles S3, S4 have a small magnetic force of about 100 gauss. If otherwise, the developer would not be attracted to the developing sleeve 61 again after being forced away too great a distance along the upstream side of the plate 63 by the repellent magnetic field X. At the position opposed to the auxiliary poles S3, S4, there must be a magnetic force capable of capturing the developer.

As stated above, the developer on the surface of the developing sleeve 61 is forced off the surface by the action of the repellent magnetic field X and then replaced. This eliminates the need to provide a scraper in pressing contact with the sleeve surface At the location Q at the upstream side of the restricting plate 63, moreover, the developer is in the form of a smooth convectional flow, permitting satisfactory charging of the toner. The developer is not restricted in bristle height at this location Q where the developer is free of the magnetic restraint of the magnetic roller 62 and is subjected only to the action of gravity and to the particle-to-particle frictional force of the developer while moving, so that an excessive stress will not act on the developer.

With reference to FIG. 4, the developer used for developing an electrostatic latent image at the developing station Y moves past the confining plate 6. At this time, air flows through a small clearance between the surface of flow of the developer and the confining plate 6 toward the direction of transport of the developer (arrow e). Also present in the vicinity of the confining plate 6 is an air stream which tends to flow in the direction of arrow f by being drawn by the surface of the drum 100. However, the peripheral speed of the developing sleeve 61 is greater (about 1.5 times) than that of the drum 100, consequently inducing in the vicinity of the confining plate 6 an air stream flowing into the casing 1. When passing directly over the pole S1, the developer is in the form of upright bristles along the magnetic flux, lines and after passing over the pole S1, the riles fall along the flux lines. This movement of the developer serves to produce a stronger air stream.

Consequently, the toner particles released at a location immediately downstream from the developing station Y are drawn into the casing 1 as they are entrained in the air stream. This eliminates the likelihood that toner particles will flow along the surface of the drum 100 and further flow out from the developing apparatus.

To achieve the above effect, the free end of the confining plate 6 must be opposed to the pole S1 immediately adjacent to the developing pole N1 in the developer transport direction, and the gap S between the plate end and the sleeve 61 needs to be equal to, or larger than, the bristle height of the developer. To produce the above-mentioned air stream, the gap S is thus made equal to the bristle height restricting gap Db or larger. The upper limit of the gap S is about four times the gap Db. A small space 6a is formed inside the confining plate 6 at the base portion thereof. The space 6a serves to reduce the velocity of the air stream drawn inside the confining plate 6 and to settle toner particles.

Figure 6:
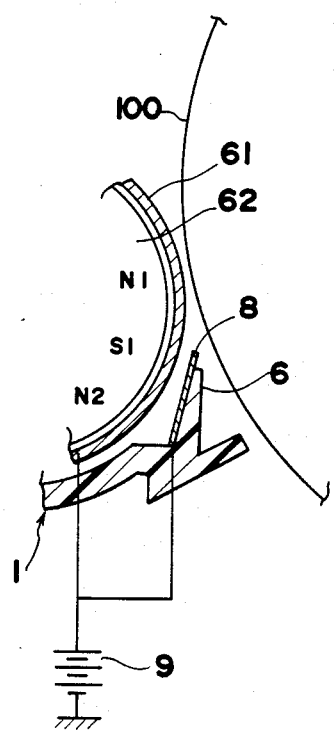
FIG. 6 is a fragmentary diagram showing a modified electrostatic latent image developing apparatus according to the invention.

As shown in FIG. 6, the confining plate 6 may be provided on the inner surface thereof with a confining plate 8 of nonmagnetic electrically conductive material. A bias voltage having a polarity opposite to the charge polarity of the toner is applied to the plate 8 by a bias voltage source 9. The bias voltage source for the developing sleeve 61 is used as the source 9 in the present embodiment. The confining plate 8 not only acts to produce an air stream like the plate 6, but also acts to attract toner particles by the application of the bias to prevent leakage of toner particles more effectively. The confining plate 8 may be made of a conductive material only at its free end portion, to which a bias voltage may be applied. This assures more satisfactory flow of toner particles.

We conducted an experiment under the following conditions.
Photosensitive drum
 Peripheral speed (system speed): 350 mm/sec
 Diameter: 100 mm
 Surface charge potential (maximum potential of electrostatic latent images): +750 V
Developing sleeve
 Diameter: 37 mm
 Number of revolutions: 293 rpm
 Peripheral speed: 567 mm/sec
 Developing bias: +200 V
 Developing gap Ds: 0.7 mm
 Bristle height restricting gap Db: 0.6–0.7 mm
 Toner confining gap S: 1.4 mm
 Gap between confining plate and drum surface: 1.0 mm
 Magnetic force of developing pole N1: 1000 G
 Magnetic force of auxiliary poles S3, S4: 100 G The experiment conducted under the above conditions revealed that latent images were developed with good results, with the developer replenished satisfactorily at the position of the auxiliary poles S3, S4. The developer moved smoothly at the location of convection, Q, while the toner was fully chargeable. The developer was found to be free of deterioration.

Briefly, the present invention provides a developing apparatus which comprises a rotatable developing sleeve, a fixed magnetic roller having auxiliary poles of the same polarity and a smaller magnetic force arranged adjacent to each other circumferentially within the sleeve and located at one side of the sleeve opposite to the developing side thereof, the auxiliary poles being opposed to an intermediate portion of the path of transport of a developer around the sleeve, a bristle height restricting plate disposed between one of the auxiliary poles and another pole positioned downstream from said one auxiliary pole, and means for supplying a fresh portion of developer to the transport path at a position upstream from the auxiliary poles. Accordingly, the portion of developer used for development and transported on the outer peripheral surface of the developing sleeve is removed from the sleeve surface by the action of a repellent magnetic field set up between the auxiliary poles and mixed and agitated by convection with a fresh supply of developer at the upstream side of the restricting plate, with the result that the used developer portion is replenished or replaced on the sleeve surface without necessitating a scraper. The developing apparatus is therefore simplified in construction, small-sized and inexpensive to fabricate. Even when minute indentations are formed in the sleeve surface to render the developer transportable efficiently, the toner will not lodge in the indentations to cause a filming phenomenon, since no scraper is used for scraping the developer off.

Further because the developer forms a smooth convectional flow at a space on the upstream side of the restricting plate, the toner can be charged satisfactorily, while there is no likelihood that the developer will be pressed against the upstream surface of the restricting plate by portions of developer subsequently forwarded, enabling the developer to retain a prolonged life with diminished deterioration. Further when the bucket roller of the foregoing embodiment is used as the developer supplying means and permits pulsating flow of the developer to be supplied, the replenishing or replacing movement of the developer described eliminates the pulsation to obviate the troubles, such as irregularities in the developed images, that could otherwise result.

What is claimed is:
1. An electrostatic latent image developing apparatus comprising:
 a developing sleeve drivingly rotatable for transporting a developer mixture in a direction along a path to an electrostatic latent image bearing surface opposite a developing side of said sleeve;
 magnetic means fixedly positioned in said developing sleeve and having a plurality of N and S poles;
 means for mixing and agitating a fresh supply of developer with said developer mixture, said means for mixing and agitating including at least two auxiliary poles having a common polarity and being provided adjacent one another at a side of the sleeve facing away from an associated latent image, one pole of said plurality of N and S poles which is of a polarity opposite to the polarity of the auxiliary poles being located adjacent one of the auxiliary poles at a position downstream thereof in the rotating direction of the developing sleeve; and a bristle height restricting plate positioned between said one pole and the auxiliary pole which is adjacent the one pole, an attractive magnetic force being exerted on the developer mixture downstream of the auxiliary poles and upstream of the bristle height restricting plate to capture the developer mixture and attract the mixture to the developing sleeve at a position adjacent the bristle height restricting plate.

2. An electrostatic latent image developing apparatus as claimed in claim 1 wherein said auxiliary poles are opposed to an intermediate portion of the path of transport of the developer.

3. An electrostatic latent image developing apparatus as claimed in claim 2 wherein said auxiliary poles have weaker magnetic force than other poles, said weaker force being about 100 Gauss.

4. An electrostatic latent image developing apparatus as claimed in claim 1 wherein said apparatus further comprises means for supplying the fresh supply of developer to the path of transport of the developer at a position upstream from said auxiliary poles with respect to the developer transport direction.

5. An electrostatic latent image developing apparatus comprising:

a developing sleeve drivingly rotatable for transporting a developer mixture in a direction along a path to an electrostatic latent image bearing surface;

magnetic means fixedly positioned in said developing sleeve and having a plurality of N and S poles arranged circumferentially within the sleeve;

means for mixing and agitating a fresh supply of developer with said developer mixture, said means for mixing and agitating including at least two auxiliary poles having a common polarity and being provided adjacent one another at a side of the sleeve facing away from an associated latent image, one pole of said plurality of N and S poles which is of a polarity opposite to the polarity of the auxiliary poles being located adjacent one of the auxiliary poles at a position downstream thereof in the rotating direction of the developing sleeve;

a bristle height restricting plate positioned between said one pole and the auxiliary pole which is adjacent the one pole, an attractive magnetic force being exerted on the developer mixture downstream of the auxiliary poles and upstream of the bristle height restricting plate to capture the developer mixture and attract the mixture to the developing sleeve at a position adjacent the bristle height restricting plate; and means for supplying the fresh developer to the developer mixture at a position upstream from said auxiliary poles with respect to the direction of transporting the developer mixture.

6. An electrostatic latent image developing apparatus as claimed in claim 5 wherein said bristle height restricting plate is set to such an angle that the developer scattered by a repellent magnetic field formed by said auxiliary poles is allowed to spontaneously fall.

7. An electrostatic latent image developing apparatus as claimed in claim 6 wherein said bristle height restricting plate is provided at an angle within a range of about 30° to 90° with respect to a horizontal surface.

8. An electrostatic latent image developing apparatus as claimed in claim 5 wherein said auxiliary poles have magnetic force of about 100 G.

* * * * *